US011909682B2

United States Patent
Pick et al.

(10) Patent No.: US 11,909,682 B2
(45) Date of Patent: Feb. 20, 2024

(54) SINGLE CARRIER WAVEFORMS FOR PHASE TRACKING REFERENCE SIGNALS

(71) Applicant: QUALCOMM Incorporated, San Diego, CA (US)

(72) Inventors: Jacob Pick, Beit Zayit (IL); Amit Bar-Or Tillinger, Tel-Aviv (IL); Shay Landis, Hod Hasharon (IL); Yehonatan Dallal, Kfar Saba (IL); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 259 days.

(21) Appl. No.: 17/446,665

(22) Filed: Sep. 1, 2021

(65) Prior Publication Data

US 2022/0077986 A1 Mar. 10, 2022

Related U.S. Application Data

(60) Provisional application No. 63/075,469, filed on Sep. 8, 2020.

(51) Int. Cl.
*H04W 72/04* (2023.01)
*H04W 84/12* (2009.01)
*H04W 76/00* (2018.01)
*H04L 5/00* (2006.01)

(52) U.S. Cl.
CPC .................. *H04L 5/0048* (2013.01)

(58) Field of Classification Search
CPC . H04L 5/0048; H04L 5/0094; H04L 27/2636; H04L 27/2613; H04L 5/0023; H04L 27/2649

USPC .......................................................... 370/329
See application file for complete search history.

(56) References Cited

U.S. PATENT DOCUMENTS

| | | | | |
|---|---|---|---|---|
| 2019/0238247 A1* | 8/2019 | Lee | .................. | H04L 27/12 |
| 2022/0400041 A1* | 12/2022 | Ling | .................. | H04L 25/0224 |
| 2023/0198715 A1* | 6/2023 | Liu | .................. | H04L 5/0023 |
| | | | | 370/329 |

FOREIGN PATENT DOCUMENTS

| | | |
|---|---|---|
| EP | 3379787 A1 | 9/2018 |
| WO | WO-2020146275 A1 | 7/2020 |

OTHER PUBLICATIONS

Huawei, et al., "Remaining Issues of PTRS," 3GPP Draft, 3GPP TSG RAN WG1 Meeting #91, R1-1719440, 3rd Generation Partnership Project (3GPP), Mobile Competence Centre, 650, Route Des Lucioles, F-06921, Sophia-Antipolis Cedex, France, vol. RAN WG1. No. Reno, USA, Nov. 27, 2017-Dec. 1, 2017, Nov. 17, 2017 (Nov. 17, 2017), XP051369142, pp. 1-9, Retrieved from http://www.3gpp.org/ftp/tsg%5Fran/WG1%5FRL1/TSGR1%5F91/Docs/.

(Continued)

*Primary Examiner* — Maharishi V Khirodhar
(74) *Attorney, Agent, or Firm* — Harrity & Harrity, LLP

(57) ABSTRACT

Various aspects of the present disclosure generally relate to wireless communication. In some aspects, a user equipment (UE) may receive, from a base station, a phase tracking reference signal. The phase tracking reference signal is transmitted using a single carrier waveform and encoded within a time domain. Accordingly, the UE may decode, from the base station, a message, based at least in part on the phase tracking reference signal. Numerous other aspects are provided.

28 Claims, 9 Drawing Sheets

(56) References Cited

OTHER PUBLICATIONS

Interdigital, Inc., "Remaining Issues on DMRS," 3GPP Draft, 3GPP TSG RAN WG1 Meeting R1#91, R1-1720633 DMRS, 3rd Generation Partnership Project (3GPP), Mobile Competence Centre, 650, Route Des Lucioles, F-06921, Sophia-Antipolis Cedex, France, vol. RAN WG1. No. Reno, USA, Nov. 27, 2017-Dec. 1, 2017, Nov. 18, 2017 (Nov. 18, 2017), XP051370098, pp. 1-14, Retrieved from http://www.3gpp.org/ftp/tsg%5Fran/WG1%5FRL1/TSGR1%5F91/Docs/.
International Search Report and Written Opinion—PCT/US2021/071344—ISA/EPO—dated Dec. 6, 2021.

\* cited by examiner

SINGLE CARRIER WAVEFORMS FOR PHASE TRACKING REFERENCE SIGNALS

CROSS-REFERENCE TO RELATED APPLICATION

This patent application claims priority to U.S. Provisional Patent Application No. 63/075,469, filed on Sep. 8, 2020, entitled "SINGLE CARRIER WAVEFORMS FOR PHASE TRACKING REFERENCE SIGNALS," and assigned to the assignee hereof. The disclosure of the prior application is considered part of and is incorporated by reference in this patent application.

FIELD OF THE DISCLOSURE

Aspects of the present disclosure generally relate to wireless communication and to techniques and apparatuses for using single carrier waveforms for phase tracking reference signals.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

The technology described herein provides for improved communication quality and reliability as well as reduced processing and network overhead. For example, by using a phase tracking reference signal (PTRS) for a single carrier and encoded in a time domain rather than multiplexed across frequencies, a base station may improve phase tracking for a user equipment (UE). As a result, integrated phase noise for the single carrier is less than an integrated phase noise for an OFDM waveform, which results in higher communication quality and reliability and therefore reduces chances of retransmissions. Fewer retransmissions conserves processing resources and power at the base station and the UE and also reduces network overhead and interference with nearby transmitters and receivers.

In some aspects, a method of wireless communication performed by a UE includes receiving, from a base station, a phase tracking reference signal, wherein the phase tracking reference signal is transmitted using a single carrier waveform and encoded within a time domain; and decoding, from the base station, a message, based at least in part on the phase tracking reference signal.

In some aspects, a method of wireless communication performed by a base station includes determining a phase tracking reference signal for a single carrier and within a time domain; and transmitting, on the single carrier and to a UE, the phase tracking reference signal.

In some aspects, an apparatus for wireless communication at a UE includes a memory and one or more processors coupled to the memory. The one or more processors are configured to receive, from a base station, a phase tracking reference signal, wherein the phase tracking reference signal is transmitted using a single carrier waveform and encoded within a time domain; and decode, from the base station, a message, based at least in part on the phase tracking reference signal.

In some aspects, an apparatus for wireless communication at a base station includes a memory and one or more processors coupled to the memory. The one or more processors are configured to determine a phase tracking reference signal for a single carrier and within a time domain; and transmit, on the single carrier and to a user equipment, the phase tracking reference signal.

In some aspects, a non-transitory computer-readable medium storing a set of instructions for wireless communication includes one or more instructions that, when executed by one or more processors of a UE, cause the UE to receive, from a base station, a phase tracking reference signal, wherein the phase tracking reference signal is transmitted using a single carrier waveform and encoded within a time domain; and decode, from the base station, a message, based at least in part on the phase tracking reference signal.

In some aspects, a non-transitory computer-readable medium storing a set of instructions for wireless communication includes one or more instructions that, when executed by one or more processors of a base station, cause the base station to determine a phase tracking reference signal for a single carrier and within a time domain; and transmit, on the single carrier and to a user equipment, the phase tracking reference signal.

In some aspects, an apparatus for wireless communication includes means for receiving, from a base station, a phase tracking reference signal, wherein the phase tracking reference signal is transmitted using a single carrier waveform and encoded within a time domain; and means for decoding, from the base station, a message, based at least in part on the phase tracking reference signal.

In some aspects, an apparatus for wireless communication includes means for determining a phase tracking reference signal for a single carrier and within a time domain; and means for transmitting, on the single carrier and to a user equipment, the phase tracking reference signal.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

The technology described herein provides for improved communication quality and reliability as well as reduced processing and network overhead. For example, by using a phase tracking reference signal (PTRS) for a single carrier and encoded in a time domain rather than multiplexed across frequencies, a base station may improve phase tracking for a user equipment (UE). As a result, integrated phase noise for the single carrier is less than an integrated phase noise for an OFDM waveform, which results in higher communication quality and reliability and therefore reduces chances of retransmissions. Fewer retransmissions conserves processing resources and power at the base station and the UE and also reduces network overhead and interference with nearby transmitters and receivers.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
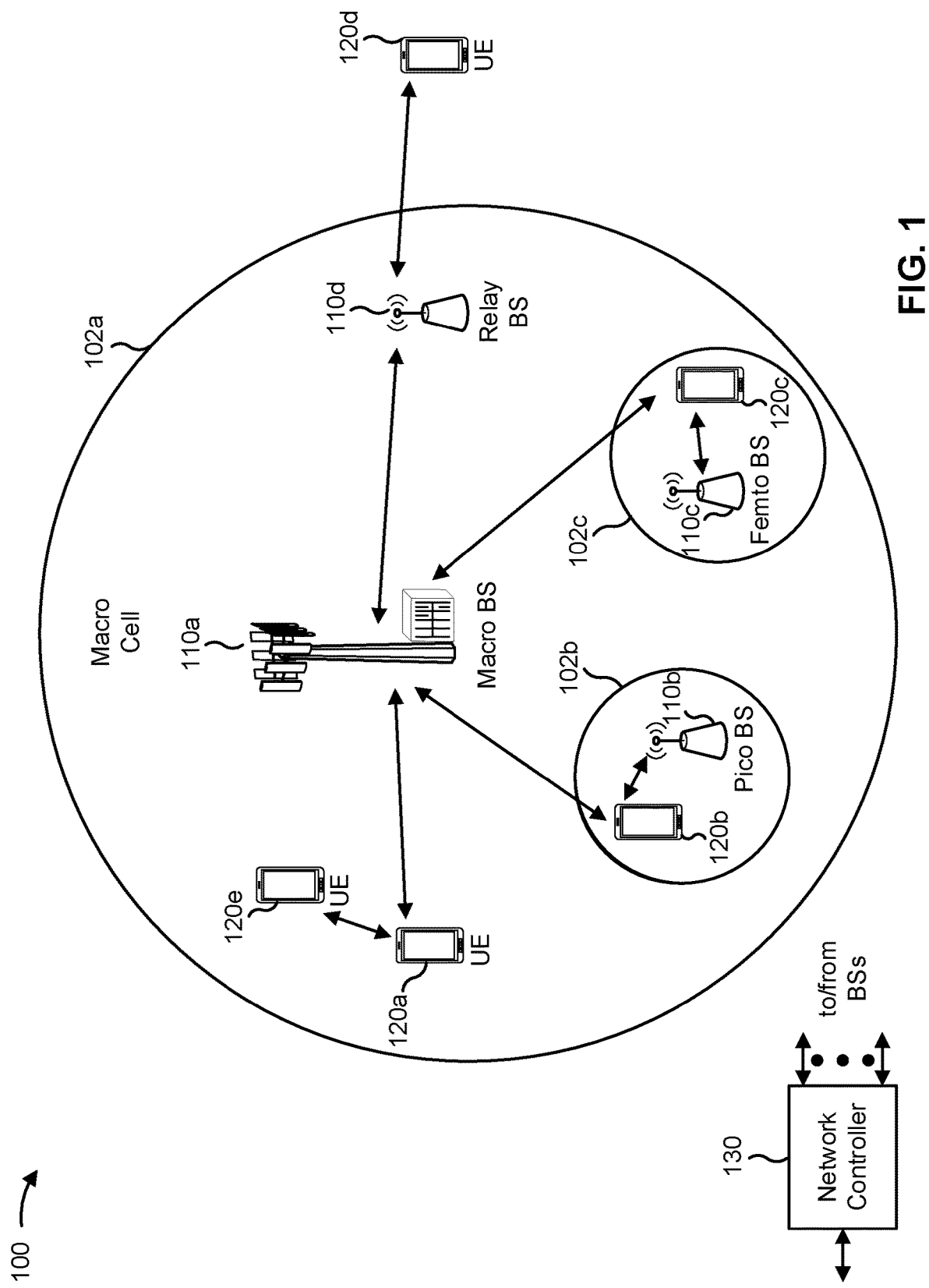
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a UE 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As indicated above, FIG. 1 is provided as an example. Other examples may differ from what is described with regard to FIG. 1.

Figure 2:
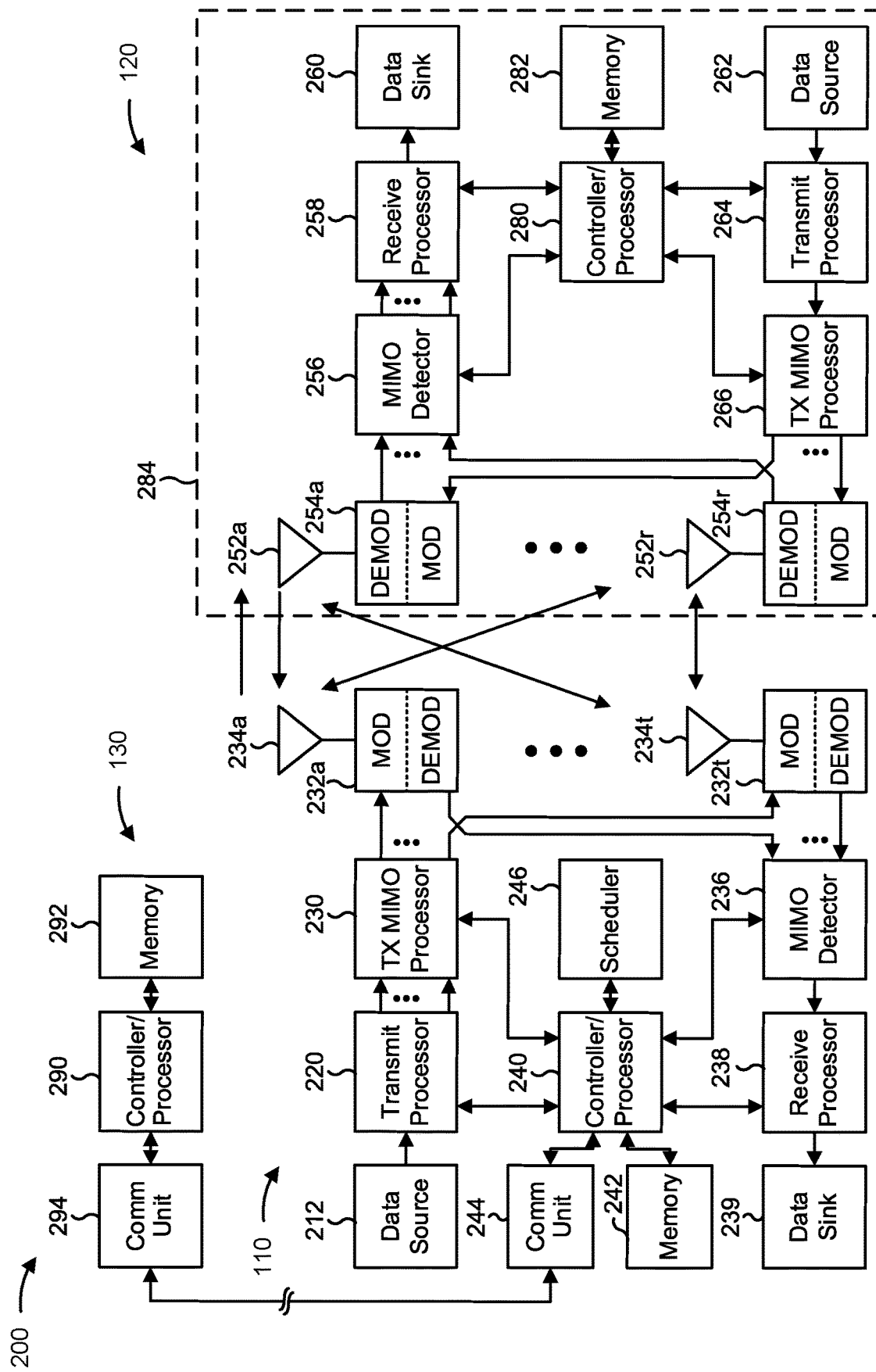
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-9).

The controller/processor 240 of the base station 110, the controller/processor 280 of the UE 120, and/or any other component(s) of FIG. 2 may perform one or more techniques associated with using single carrier waveforms for phase tracking reference signals, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, a UE (e.g., the UE 120 and/or apparatus 800 of FIG. 8) may include means for receiving, from a base station (e.g., the base station 110 and/or apparatus 900 of FIG. 9), a phase tracking reference signal, wherein the phase tracking reference signal is transmitted using a single carrier waveform and encoded within a time domain; and/or means for decoding, from the base station, a message, based at least in part on the phase tracking reference signal. The means for the UE to perform operations described herein may include, for example, one or more of antenna 252, modem 254, MIMO detector 256, receive processor 258, transmit processor 264, TX MIMO processor 266, controller/processor 280, or memory 282.

In some aspects, a base station (e.g., the base station 110 and/or apparatus 900 of FIG. 9) may include means for determining a phase tracking reference signal for a single carrier and within a time domain; and/or means for transmitting, on the single carrier and to a UE (e.g., the UE 120 and/or apparatus 800 of FIG. 8), the phase tracking reference signal. The means for the base station to perform operations described herein may include, for example, one or more of transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
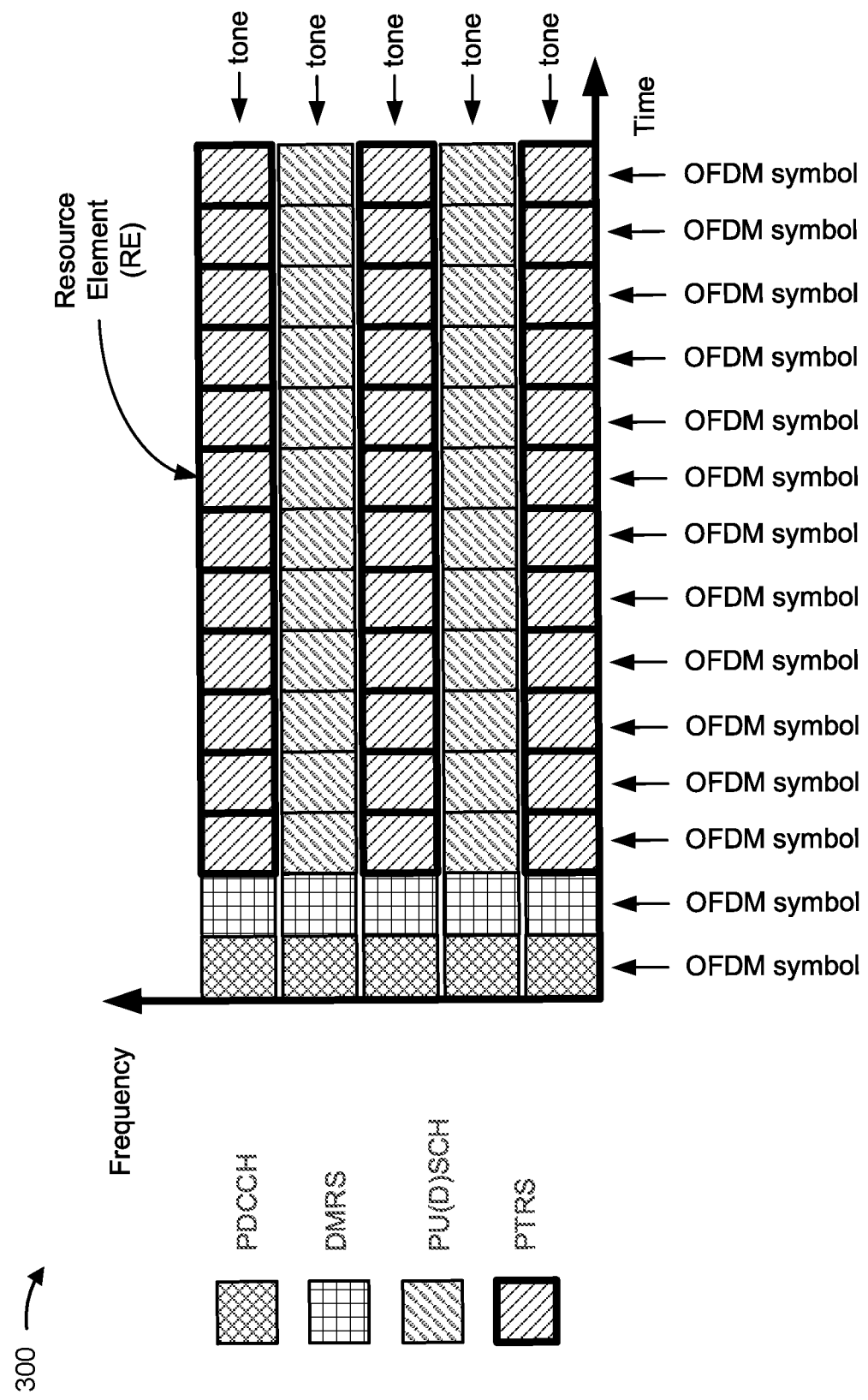
FIG. 3 is a diagram illustrating an example of assigning of phase tracking reference signals (PTRSs) and other signals and channels to resource elements (REs) in an OFDM implementation, in accordance with the present disclosure.

FIG. 3 is a diagram illustrating an example 300 of an assignment of phase tracking reference signals (PTRSs) and other signals and channels to resource elements (REs) in an OFDM implementation, in accordance with the present disclosure. FIG. 3 illustrates PTRS pilot signals (also referred to as PTRS pilot tones) for an orthogonal frequency division multiplexing with a cyclic prefix (CP-OFDM) communication system. PTRS pilot signals may be continuous (as illustrated) or discontinuous in the time domain. For a UE 120, the PTRS signals may occupy one tone or several tones, based at least in part on a scheduled bandwidth, an MCS, a signal-to-noise ratio (SNR), an interference level, a port mapping, and/or another attribute that may impact the received signal quality of communication signals. A tone may be referred to as a subcarrier, in some aspects.

PTRS pilot signals may be used by the UE 120 and/or the base station 110 for phase tracking, for phase estimation, and/or to correct oscillator phase noise, especially for millimeter wave communications. A PTRS may be embedded in a physical downlink shared channel (PDSCH) resource allocation or a physical uplink shared channel (PUSCH) allocation. In some cases, one PTRS port may be configured for downlink communication (e.g., within a PDSCH resource allocation), and up to two PTRS ports may be configured for uplink communication (e.g., within a PUSCH resource allocation). For CP-OFDM communication, a PTRS may use the same sequence as a corresponding DMRS, which may be a Gold sequence (e.g., a quadrature phase-shift keying (QPSK) modulated Gold sequence). In some aspects, a correspondence between a PTRS port and a DMRS port may be indicated to the UE by a base station (e.g., via a DMRS-PTRS association indicated in downlink control information). In some cases, for uplink communications, a greater number of DMRS ports (e.g., up to 4 DMRS ports) may be configured for a UE than a number of PTRS ports (e.g., up to 2 PTRS ports) configured for the UE.

A higher SNR in the PTRS pilot signals may provide a more accurate phase error estimation. Accordingly, in some aspects, the PTRS pilot signals may be located in the tones with good channel conditions, high SNR, and/or high signal-to-interference-plus-noise ratio (SINK), which may result in more accurate phase tracking at the UE 120. Increasing the number of PTRS pilot signals may provide more accurate phase error estimation. For example, an increased number of PTRS pilot signals may allow for thermal noise to be averaged out over the larger number of PTRS pilot signals. Additionally, an increased number of PTRS pilot signals may allow for frequency diversity to be exploited.

However, using a large number of PTRS pilot signals may increase overhead. Furthermore, the gain from increasing the number of PTRS pilot signals may saturate for a given number of PTRS pilot signals in a scheduled bandwidth. Accordingly, UEs 120 with a large scheduled bandwidth may use a sparser PTRS frequency domain pattern. Conversely, UEs 120 with a small scheduled bandwidth may use a denser PTRS frequency domain pattern. PTRS may be relatively sparse in frequency compared to DMRS. For example, one PTRS resource element (RE) may be used in every 2 or 4 resource blocks (RBs), while 4 or 6 DMRS REs may be used in every RB. As shown in FIG. 3, PTRS may be relatively dense in time as compared to DMRS.

The required number of PTRS pilot signals to achieve a certain performance requirement (e.g., a bit error rate less than 0.5%, 1%, 2%, or another threshold), for a given scheduled bandwidth may depend on a number of factors, such as channel conditions, UE speed, UE capability, UE processing power, UE battery charge, mobility, and other factors that may impact a communication system's performance. A communication system with too few PTRS signals may result in more retransmissions due to channel errors, which reduces throughput. A system with too many PTRS signals may utilize valuable system bandwidth for a minimal decrease in channel error rate.

Some communication systems may use a fixed PTRS pattern (e.g., in the time domain and/or frequency domain), such as the PTRS pattern shown in FIG. 3. In this case, the density of PTRS pilot signals may be fixed both in the number of PTRS pilot signals and the resource elements that carry PTRS pilot signals. Alternatively, some communication systems may use a flexible PTRS configuration, where resource elements carrying PTRS pilot tones may be flexibly configured.

As indicated above, FIG. 3 is provided as an example. Other examples may differ from what is described with regard to FIG. 3.

Figure 4:
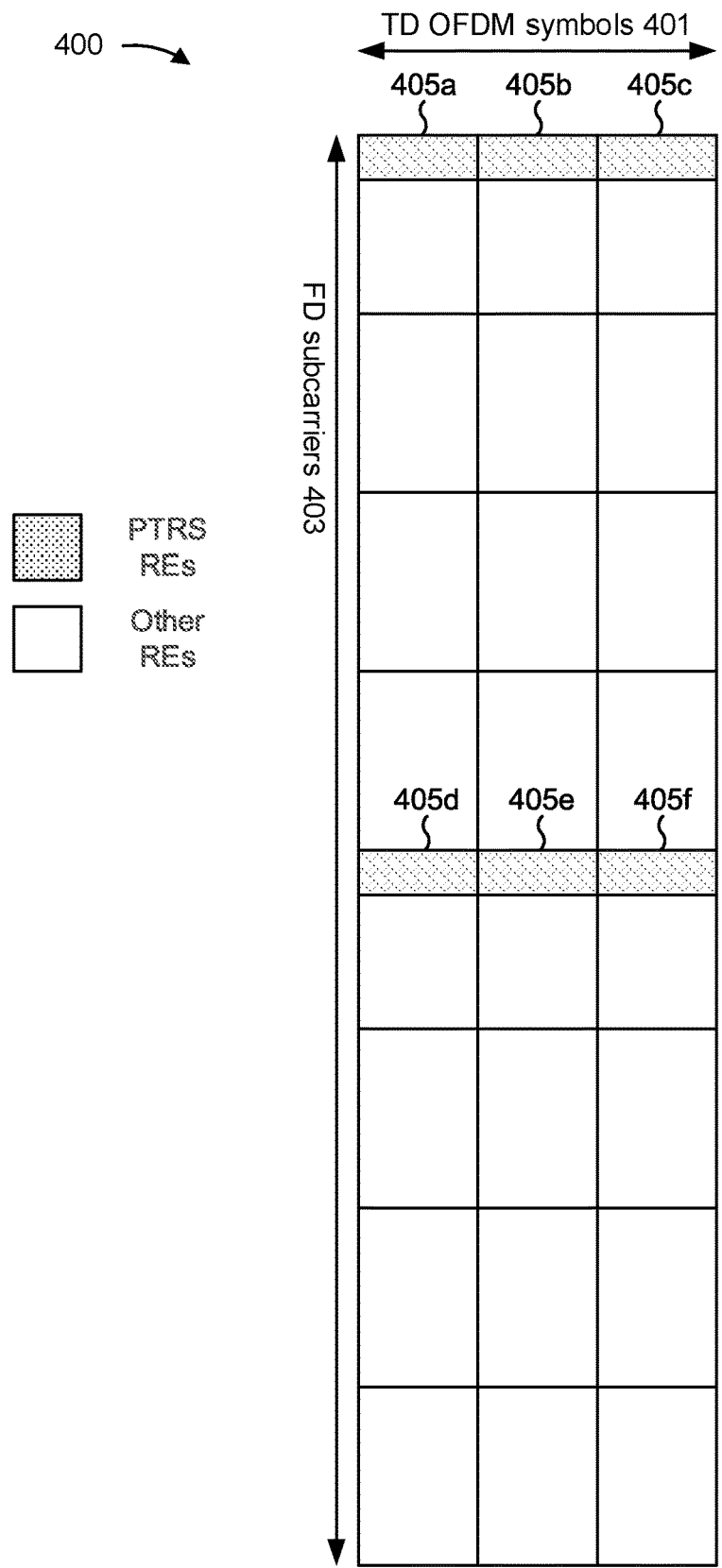
FIG. 4 is a diagram illustrating an example of multiple carrier waveforms for PTRSs over frequency in the OFDM implementation, in accordance with the present disclosure.

FIG. 4 is a diagram illustrating an example 400 of multiple carrier waveforms for PTRSs in the OFDM implementation, in accordance with the present disclosure. As shown in FIG. 4, example 400 includes three OFDM symbols 401 that are time duplexed as well as frequency duplexed across eight subcarriers 403. Although the description herein focuses on eight subcarriers and three OFDM symbols, the description similarly applies to other numbers of subcarriers (e.g., two subcarriers, four subcarriers, ten subcarriers, and so on) and/or other numbers of OFDM symbols (e.g., two OFDM symbols, four OFDM symbols, five OFDM symbols, and so on).

As shown in FIG. 4, a PTRS waveform for multiple carriers may be encoded every four RBs in the frequency domain and every OFDM symbol in the time domain. Accordingly, the PTRS waveform is encoded in REs 405a, 405b, and 405c for four RBs and in REs 405d, 405e, and 405f for another four RBs. Other examples may include the PTRS waveform every two RBs in the frequency domain and/or every two or four OFDM symbols in the time domain.

For higher frequencies (e.g., FR2), phase noise increases significantly as compared with lower frequencies (e.g., FR1). Additionally, FR2 and even higher frequency bands rely on significant amounts of power in order to perform fast Fourier transforms on OFDM symbols. Therefore, a single carrier may be used on FR2 and higher bands in lieu of OFDM. However, OFDM waveforms for PTRSs rely on multiplexing across frequencies. Moreover, OFDM waveforms for PTRSs result in integrated phase noise that totals twice an integration of a corresponding phase noise mask, from half of a subcarrier spacing in the OFDM waveform, to half of a working bandwidth for the OFDM waveform. In higher frequencies, this integrated phase noise increases significantly.

Some techniques and apparatuses described herein enable a base station (e.g., base station 110) to transmit a PTRS for a single carrier and encoded in a time domain rather than multiplexed across frequencies. As a result, the base station 110 may improve phase tracking for a UE (e.g., UE 120). Additionally, the integrated un-tracked phase noise for OFDM based PTRS is much larger than the integrated un-tracked phase noise at single carrier based PTRS, due to a higher sampling rate. Thus, the integrated phase noise for the single carrier is less than an integrated phase noise for an OFDM waveform.

As indicated above, FIG. 4 is provided as an example. Other examples may differ from what is described with respect to FIG. 4.

Figure 5:
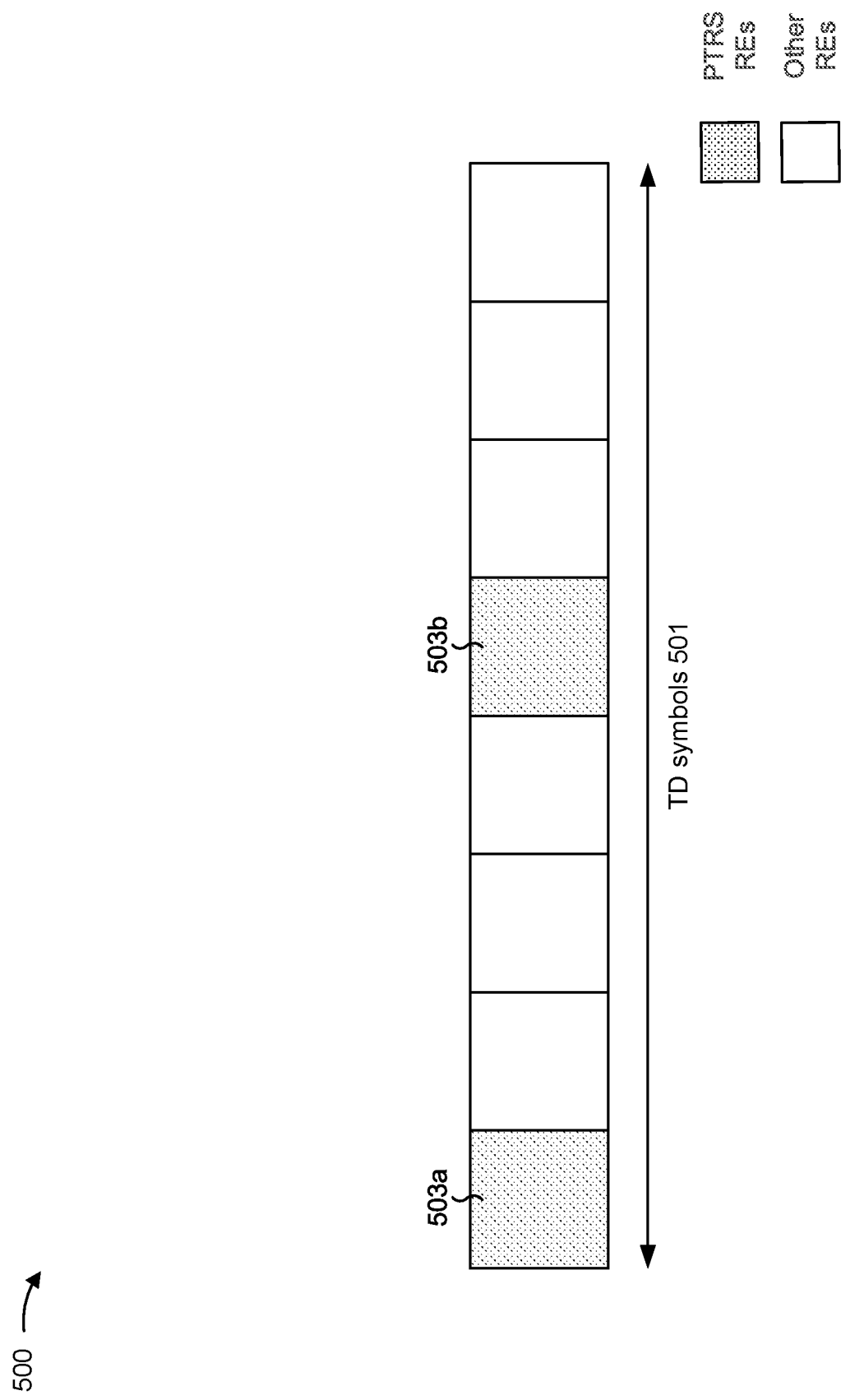
FIG. 5 is a diagram illustrating an example associated with single carrier waveforms for PTRSs, in accordance with the present disclosure.

FIG. 5 is a diagram illustrating an example 500 associated with single carrier waveforms for PTRSs, in accordance with the present disclosure. Accordingly, example 500 may be used in a single carrier implementation rather than the OFDM implementation described in connection with FIGS. 3-4. As shown in FIG. 5, example 500 includes eight single carrier symbols 501 that are time duplexed. Although the description herein focuses on eight single carrier symbols, the description similarly applies to other numbers of single carrier symbols (e.g., two single carrier symbols, four single carrier symbols, nine single carrier symbols, ten single carrier symbols, and so on).

As shown in FIG. 5, a PTRS waveform for a single carrier may be encoded in the time domain without multiplexing over frequencies. In example 500, the PTRS waveform is encoded directly in the time domain via REs 503a and 503b without frequency multiplexing. Accordingly, a base station (e.g., base station 110) may transmit, and a UE (e.g., UE 120) may receive, the PTRS that is transmitted using a single carrier waveform and encoded within a time domain. Because the base station 110 may transmit more symbols in a same amount of time by using the single carrier, as compared with using OFDM symbols, the base station 110 may transmit the PTRS with greater density in the time domain as compared to a PTRS using OFDM symbols (e.g., as described in connection with FIG. 4).

Further, the base station 110 may transmit, and the UE 120 may decode, a message, based at least in part on the PTRS. For example, decoding based at least in part on the PTRS may include estimating phase noise based at least in part on the PTRS. Accordingly, the UE 120 may estimate phase noise using the PTRS and correct signals received from the base station 110, based at least in part on the estimated phase noise, such that the UE 120 can decode a message from the corrected signals.

In some aspects, the PTRS may be based at least in part on a sequence with zero mean and a difference between auto-correlation and a low cross-correlation property. A sequence has low cross-correlation when two of those sequences of the same length (e.g., represented by $2^n-1$) have an absolute cross-correlation that is less than or equal to $2^{(n+2)/2}$, where n represents a size of a linear feedback shift register used to generate those sequences. For example, the PTRS may be based at least in part on the Gold sequence and/or another similar sequence. In some aspects, the sequence may be initiated based at least in part on an index of a slot that includes the PTRS and an indicator of an antenna port that the base station 110 used to transmit the PTRS.

Additionally, or alternatively, the PTRS may be based at least in part on an index of a symbol that includes the PTRS. Additionally, or alternatively, the PTRS may be based at least in part on an indicator of a layer including the symbol. Additionally, or alternatively, the PTRS may be based at least in part on an indicator of an antenna port (e.g., used by the base station 110 to transmit the PTRS). For example, the PTRS may be based at least in part on an expression similar to the form $$\frac{1}{\sqrt{2}}((1-2c_t(2k))+j(1-2c_t(2k))),$$

where $c_t$ represents a sequence, t represents an indicator of an antenna port that the base station 110 used to transmit the PTRS, k represents an index of a symbol that includes the PTRS, and $j=\sqrt{-1}$. As explained above, $c_t$ may include a sequence with zero mean and a difference between auto-correlation and a low cross-correlation property, such as the Gold sequence and/or another similar sequence.

In some aspects, the PTRS may have a configurable period. For example, the base station 110 may transmit, and the UE 120 may receive, an indication of a period associated with the PTRS. In example 500, the base station 110 may indicate that the PTRS repeats every fourth symbol such that the UE 120 measures the PTRS every fourth symbol to estimate phase noise.

By using waveforms as described in connection with FIG. 5, the base station 110 improves phase tracking for the UE 120, resulting in higher-quality communications. Additionally, the integrated phase noise experienced by the base station 110 and the UE 120 decreases, as explained above. Accordingly, the base station 110 and the UE 120 experience higher reliability in communications.

As indicated above, FIG. 5 is provided as an example. Other examples may differ from what is described with respect to FIG. 5.

Figure 6:
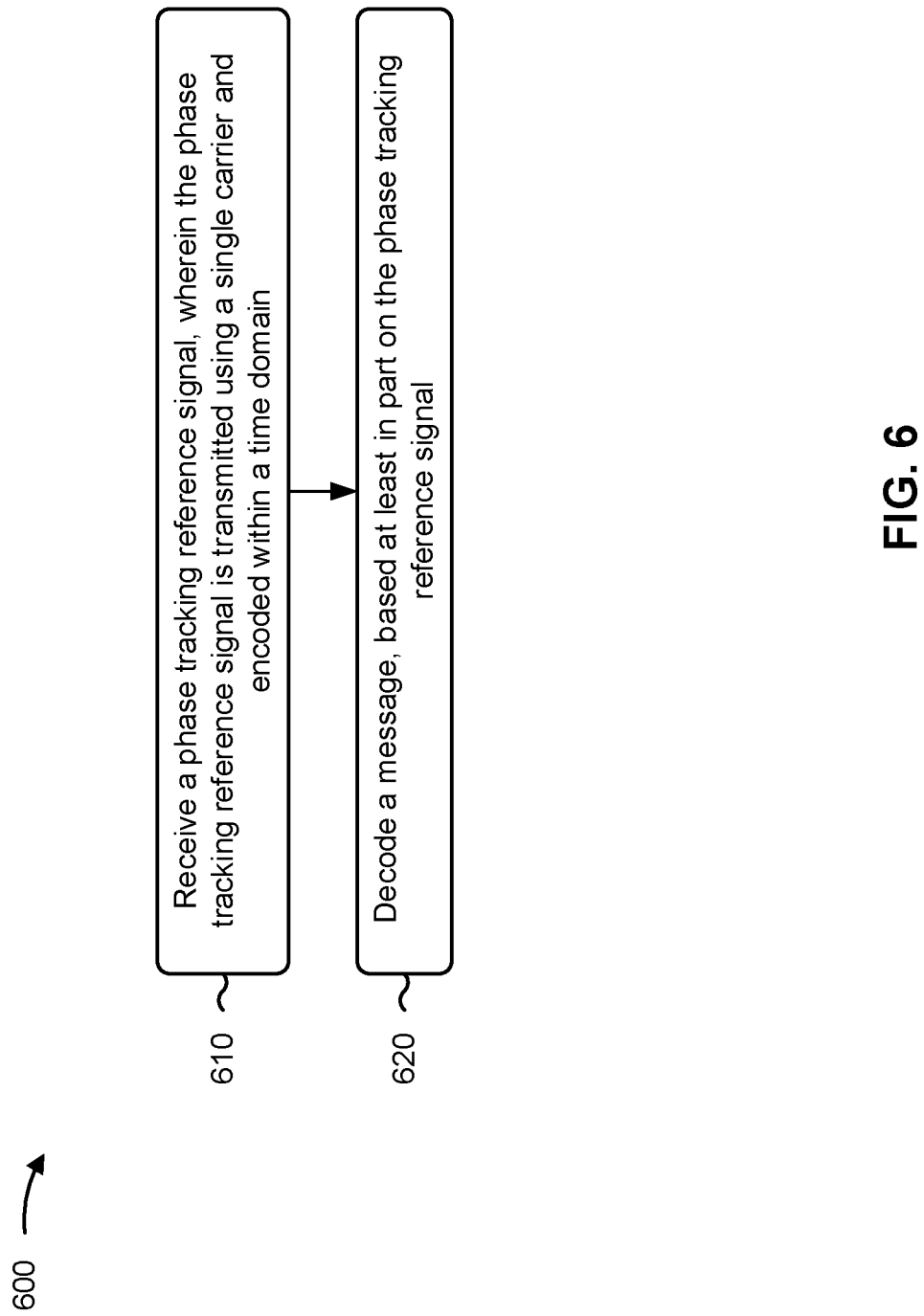
FIGS. 6 and 7 are diagrams illustrating example processes associated with using single carrier waveforms for PTRSs, in accordance with the present disclosure.

FIG. 6 is a diagram illustrating an example process 600 performed, for example, by a UE, in accordance with the present disclosure. Example process 600 is an example where the UE (e.g., UE 120 and/or apparatus 800 of FIG. 8) performs operations associated with using single carrier waveforms for phase tracking.

As shown in FIG. 6, in some aspects, process 600 may include receiving, from a base station (e.g., base station 110 and/or apparatus 900 of FIG. 9), a PTRS (block 610). For example, the UE (e.g., using reception component 802, depicted in FIG. 8) may receive, from a base station, a PTRS, as described herein. In some aspects, the PTRS is transmitted using a single carrier waveform and encoded within a time domain.

As further shown in FIG. 6, in some aspects, process 600 may include decoding, from the base station, a message, based at least in part on the PTRS (block 620). For example, the UE (e.g., using decoding component 808, depicted in FIG. 8) may decode, from the base station, a message, based at least in part on the PTRS, as described herein.

Process 600 may include additional aspects, such as any single aspect or any combination of aspects described below and/or in connection with one or more other processes described elsewhere herein.

In a first aspect, the PTRS is based at least in part on a sequence with zero mean and a difference between auto-correlation and a low cross-correlation property.

In a second aspect, alone or in combination with the first aspect, the sequence is initiated based at least in part on an index of a slot that includes the PTRS and an indicator of an antenna port that the base station used to transmit the PTRS.

In a third aspect, alone or in combination with one or more of the first and second aspects, the PTRS is based at least in part on an index of a symbol that includes the PTRS.

In a fourth aspect, alone or in combination with one or more of the first through third aspects, the PTRS is based at least in part on an indicator of a layer including the symbol.

In a fifth aspect, alone or in combination with one or more of the first through fourth aspects, decoding based at least in part on the PTRS includes estimating phase noise based at least in part on the PTRS.

In a sixth aspect, alone or in combination with one or more of the first through fifth aspects, process 600 further includes receiving (e.g., using reception component 802), from the base station, an indication of a period associated with the PTRS, the PTRS being received based at least in part on the period.

In a seventh aspect, alone or in combination with one or more of the first through sixth aspects, the PTRS is based at least in part on a sequence, an indicator of an antenna port, and an index of a symbol that includes the PTRS.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
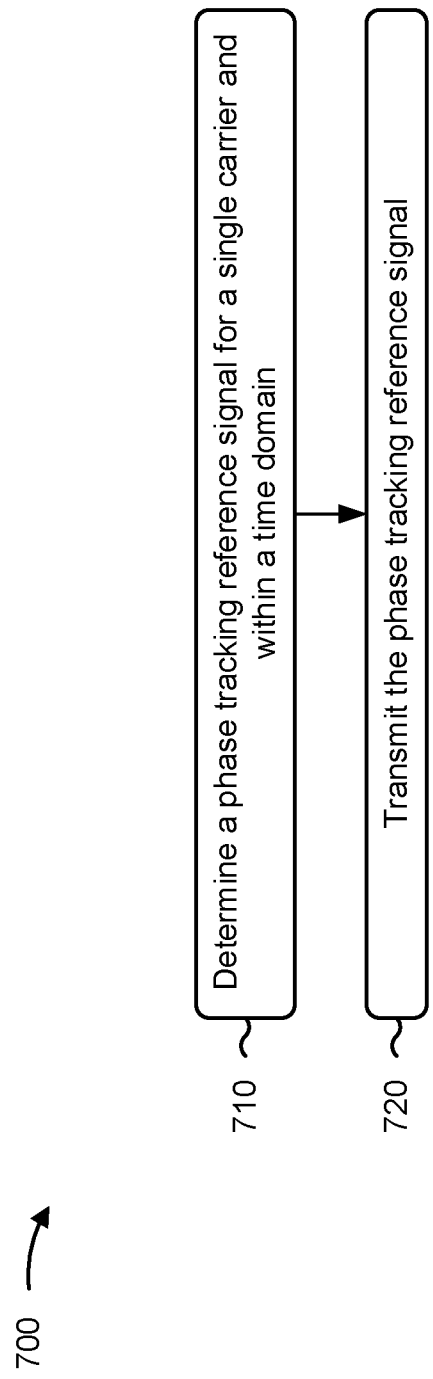

FIG. 7 is a diagram illustrating an example process 700 performed, for example, by a base station, in accordance with the present disclosure. Example process 700 is an example where the base station (e.g., base station 110 and/or apparatus 900 of FIG. 9) performs operations associated with using single carrier waveforms for phase tracking.

As shown in FIG. 7, in some aspects, process 700 may include determining a PTRS for a single carrier and within a time domain (block 710). For example, the base station (e.g., using determination component 908, depicted in FIG. 9) may determine a PTRS for a single carrier and within a time domain, as described herein.

As further shown in FIG. 7, in some aspects, process 700 may include transmitting, on the single carrier and to a UE (e.g., UE 120 and/or apparatus 800 of FIG. 8), the PTRS (block 720). For example, the base station (e.g., using transmission component 904, depicted in FIG. 9) may transmit, on the single carrier and to a UE, the PTRS, as described herein.

Process 700 may include additional aspects, such as any single aspect or any combination of aspects described below and/or in connection with one or more other processes described elsewhere herein.

In a first aspect, the PTRS is based at least in part on a sequence with zero mean and a difference between auto-correlation and a low cross-correlation property.

In a second aspect, alone or in combination with the first aspect, the sequence is initiated based at least in part on an index of a slot that includes the PTRS and an indicator of an antenna port that the base station used to transmit the PTRS.

In a third aspect, alone or in combination with one or more of the first and second aspects, the PTRS is based at least in part on an index of a symbol that includes the PTRS.

In a fourth aspect, alone or in combination with one or more of the first through third aspects, the PTRS is based at least in part on an indicator of a layer including the symbol.

In a fifth aspect, alone or in combination with one or more of the first through fourth aspects, the PTRS allows the UE to estimate phase noise based at least in part on the PTRS.

In a sixth aspect, alone or in combination with one or more of the first through fifth aspects, process 700 further includes transmitting (e.g., using transmission component 904), to the UE, an indication of a period associated with the PTRS, the PTRS being transmitted based at least in part on the period.

In a seventh aspect, alone or in combination with one or more of the first through sixth aspects, the PTRS is based at least in part on a sequence, an indicator of an antenna port, and an index of a symbol that includes the PTRS.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
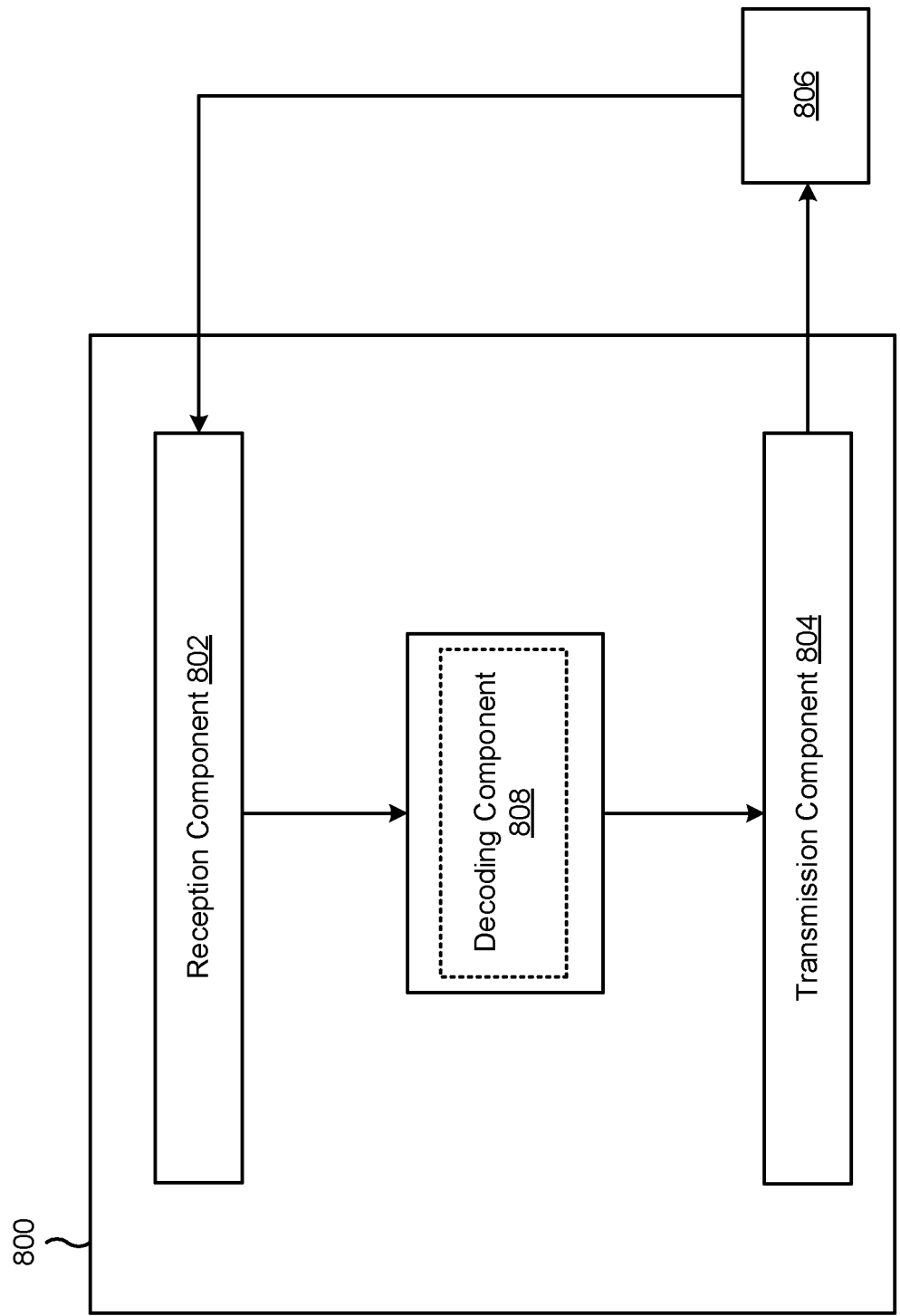
FIGS. 8 and 9 are diagrams of example apparatuses for wireless communication, in accordance with the present disclosure.

FIG. 8 is a block diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a decoding component 808, among other examples.

In some aspects, the apparatus 800 may be configured to perform one or more operations described herein in connection with FIG. 5. Additionally, or alternatively, the apparatus 800 may be configured to perform one or more processes described herein, such as process 600 of FIG. 6, or a combination thereof. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be co-located with the reception component 802 in a transceiver.

In some aspects, the reception component 802 may receive (e.g., from the apparatus 806) a PTRS that is transmitted using a single carrier waveform and encoded within a time domain. Accordingly, the decoding component 808 may decode (e.g., from the apparatus 806) a message based at least in part on the PTRS. In some aspects, the decoding component 808 may include one or more antennas, a demodulator, a MIMO detector, a receive processor, a controller/processor, a memory, or a combination thereof, of the UE described above in connection with FIG. 2. For example, the decoding component 808 may use the PTRS to estimate a phase noise and use the estimated phase noise, at least in part, to decode the message.

In some aspects, the reception component 802 may further receive (e.g., from the apparatus 806) an indication of a period associated with the PTRS. Accordingly, the reception component 802 may receive the PTRS based at least in part on the period.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
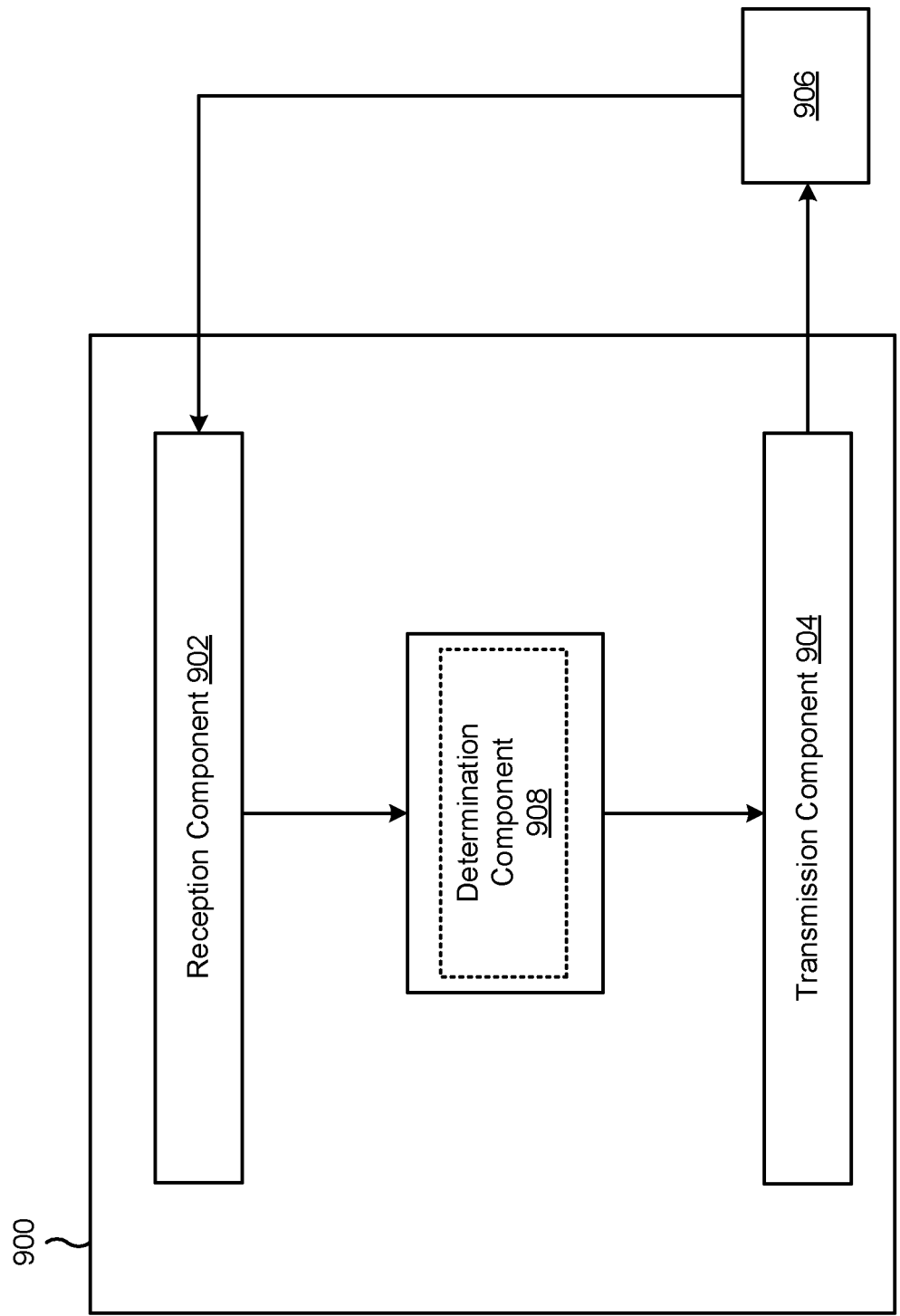

FIG. 9 is a block diagram of an example apparatus 900 for wireless communication. The apparatus 900 may be a base station, or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a determination component 908, among other examples.

In some aspects, the apparatus 900 may be configured to perform one or more operations described herein in connection with FIG. 5. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the base station described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a demodulator, a MIMO detector, a receive processor, a controller/processor, a memory, or a combination thereof, of the base station described above in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the base station described above in connection with FIG. 2. In some aspects, the transmission component 904 may be co-located with the reception component 902 in a transceiver.

In some aspects, the determination component 908 may determine a PTRS for a single carrier and within a time domain. In some aspects, the determination component 908 may include one or more antennas, a modulator, a transmit MIMO processor, a transmit processor, a controller/processor, a memory, or a combination thereof, of the base station described above in connection with FIG. 2. Accordingly, transmission component 904 may transmit, on the single carrier and to the apparatus 906, the PTRS. In some aspects, the transmission component 904 may further transmit (e.g., to the apparatus 906) a message such that the apparatus 906 may use the PTRS to estimate a phase noise and use the estimated phase noise, at least in part, to decode the message.

In some aspects, the transmission component 904 may further transmit (e.g., to the apparatus 906) an indication of a period associated with the PTRS. Accordingly, the transmission component 904 may transmit the PTRS based at least in part on the period.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: receiving, from a base station, a phase tracking reference signal, wherein the phase tracking reference signal is transmitted using a single carrier waveform and encoded within a time domain; and decoding, from the base station, a message, based at least in part on the phase tracking reference signal.

Aspect 2: The method of Aspect 1, wherein the phase tracking reference signal is based at least in part on a sequence with zero mean and a low cross-correlation property.

Aspect 3: The method of Aspect 2, wherein the sequence is initiated based at least in part on an index of a slot that includes the phase tracking reference signal and an indicator of an antenna port that the base station used to transmit the phase tracking reference signal.

Aspect 4: The method of any of Aspects 1 through 3, wherein the phase tracking reference signal is based at least in part on an index of a symbol that includes the phase tracking reference signal.

Aspect 5: The method of Aspect 4, wherein the phase tracking reference signal is based at least in part on an indicator of a layer including the symbol.

Aspect 6: The method of any of Aspects 1 through 5, wherein decoding based at least in part on the phase tracking reference signal includes estimating phase noise based at least in part on the phase tracking reference signal.

Aspect 7: The method of any of Aspects 1 through 6, further comprising: receiving, from the base station, an indication of a period associated with the phase tracking reference signal, wherein the phase tracking reference signal is received based at least in part on the period.

Aspect 8: The method of any of Aspects 1 through 7, wherein the phase tracking reference signal is based at least in part on a sequence, an indicator of an antenna port, and an index of a symbol that includes the phase tracking reference signal.

Aspect 9: A method of wireless communication performed by a base station, comprising: determining a phase tracking reference signal for a single carrier and within a time domain; and transmitting, on the single carrier and to a user equipment (UE), the phase tracking reference signal.

Aspect 10: The method of Aspect 9, wherein the phase tracking reference signal is based at least in part on a sequence with zero mean and a low cross-correlation property.

Aspect 11: The method of Aspect 10, wherein the sequence is initiated based at least in part on an index of a slot that includes the phase tracking reference signal and an indicator of an antenna port that the base station used to transmit the phase tracking reference signal.

Aspect 12: The method of any of Aspects 9 through 11, wherein the phase tracking reference signal is based at least in part on an index of a symbol that includes the phase tracking reference signal.

Aspect 13: The method of Aspect 12, wherein the phase tracking reference signal is based at least in part on an indicator of a layer including the symbol.

Aspect 14: The method of any of Aspects 9 through 13, the phase tracking reference signal allows the UE to estimate phase noise based at least in part on the phase tracking reference signal.

Aspect 15: The method of any of Aspects 9 through 14, further comprising: transmitting, to the UE, an indication of a period associated with the phase tracking reference signal, wherein the phase tracking reference signal is transmitted based at least in part on the period.

Aspect 16: The method of any of Aspects 9 through 15, wherein the phase tracking reference signal is based at least in part on a sequence, an indicator of an antenna port, and an index of a symbol that includes the phase tracking reference signal.

Aspect 17: An apparatus for wireless communication at a device, comprising a processor; memory coupled with the processor; and instructions stored in the memory and executable by the processor to cause the apparatus to perform the method of one or more of Aspects 1-8.

Aspect 18: A device for wireless communication, comprising a memory and one or more processors coupled to the memory, the one or more processors configured to perform the method of one or more of Aspects 1-8.

Aspect 19: An apparatus for wireless communication, comprising at least one means for performing the method of one or more of Aspects 1-8.

Aspect 20: A non-transitory computer-readable medium storing code for wireless communication, the code comprising instructions executable by a processor to perform the method of one or more of Aspects 1-8.

Aspect 21: A non-transitory computer-readable medium storing a set of instructions for wireless communication, the set of instructions comprising one or more instructions that, when executed by one or more processors of a device, cause the device to perform the method of one or more of Aspects 1-8.

Aspect 22: An apparatus for wireless communication at a device, comprising a processor; memory coupled with the processor; and instructions stored in the memory and executable by the processor to cause the apparatus to perform the method of one or more of Aspects 9-16.

Aspect 23: A device for wireless communication, comprising a memory and one or more processors coupled to the memory, the one or more processors configured to perform the method of one or more of Aspects 9-16.

Aspect 24: An apparatus for wireless communication, comprising at least one means for performing the method of one or more of Aspects 9-16.

Aspect 25: A non-transitory computer-readable medium storing code for wireless communication, the code comprising instructions executable by a processor to perform the method of one or more of Aspects 9-16.

Aspect 26: A non-transitory computer-readable medium storing a set of instructions for wireless communication, the set of instructions comprising one or more instructions that, when executed by one or more processors of a device, cause the device to perform the method of one or more of Aspects 9-16.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving, from a base station, a phase tracking reference signal,
   wherein the phase tracking reference signal was transmitted using a single carrier waveform and encoded within a time domain; and
   decoding a message, received from the base station, based at least in part on the phase tracking reference signal,
   wherein the phase tracking reference signal is based at least in part on a sequence with zero mean and a low cross-correlation property.

2. The method of claim 1, wherein the sequence is initiated based at least in part on an index of a slot that includes the phase tracking reference signal and an indicator of an antenna port that the base station used to transmit the phase tracking reference signal.

3. The method of claim 1, wherein the phase tracking reference signal is based at least in part on an index of a symbol that includes the phase tracking reference signal.

4. The method of claim 3, wherein the phase tracking reference signal is based at least in part on an indicator of a layer including the symbol.

5. The method of claim 1, wherein decoding based at least in part on the phase tracking reference signal includes estimating phase noise based at least in part on the phase tracking reference signal.

6. The method of claim 1, further comprising:
   receiving, from the base station, an indication of a period associated with the phase tracking reference signal,
   wherein the phase tracking reference signal is received based at least in part on the period.

7. The method of claim 1, wherein the phase tracking reference signal is based at least in part on an indicator of an antenna port and an index of a symbol that includes the phase tracking reference signal.

8. A method of wireless communication performed by a base station, comprising:
   determining a phase tracking reference signal for a single carrier and within a time domain; and
   transmitting, on the single carrier and to a user equipment (UE), the phase tracking reference signal,
   wherein the phase tracking reference signal is based at least in part on a sequence with zero mean and a low cross-correlation property.

9. The method of claim 8, wherein the sequence is initiated based at least in part on an index of a slot that includes the phase tracking reference signal and an indicator of an antenna port that the base station used to transmit the phase tracking reference signal.

10. The method of claim 8, wherein the phase tracking reference signal is based at least in part on an index of a symbol that includes the phase tracking reference signal.

11. The method of claim 10, wherein the phase tracking reference signal is based at least in part on an indicator of a layer including the symbol.

12. The method of claim 8, the phase tracking reference signal is configured to allow the UE to estimate phase noise based at least in part on the phase tracking reference signal.

13. The method of claim 8, further comprising:
   transmitting, to the UE, an indication of a period associated with the phase tracking reference signal,
   wherein the phase tracking reference signal is transmitted based at least in part on the period.

14. The method of claim 8, wherein the phase tracking reference signal is based at least in part on an indicator of an antenna port and an index of a symbol that includes the phase tracking reference signal.

15. An apparatus for wireless communication at a user equipment (UE), comprising memory, and one or more processors coupled to the memory and configured to:
receive, from a base station, a phase tracking reference signal,
wherein the phase tracking reference signal was transmitted using a single carrier waveform and encoded within a time domain; and
decode a message, received from the base station, based at least in part on the phase tracking reference signal,
wherein the phase tracking reference signal is based at least in part on a sequence with zero mean and a low cross-correlation property.

16. The apparatus of claim 15, wherein the sequence is initiated based at least in part on an index of a slot that includes the phase tracking reference signal and an indicator of an antenna port that the base station used to transmit the phase tracking reference signal.

17. The apparatus of claim 15, wherein the phase tracking reference signal is based at least in part on an index of a symbol that includes the phase tracking reference signal.

18. The apparatus of claim 17, wherein the phase tracking reference signal is based at least in part on an indicator of a layer including the symbol.

19. The apparatus of claim 15, wherein the one or more processors, to decode based at least in part on the phase tracking reference signal, are configured to estimate phase noise based at least in part on the phase tracking reference signal.

20. The apparatus of claim 15, wherein the one or more processors are further configured to:
receive, from the base station, an indication of a period associated with the phase tracking reference signal,
wherein the phase tracking reference signal is received based at least in part on the period.

21. The apparatus of claim 15, wherein the phase tracking reference signal is based at least in part on an indicator of an antenna port and an index of a symbol that includes the phase tracking reference signal.

22. An apparatus for wireless communication at a base station, comprising memory, and one or more processors coupled to the memory and configured to:
determine a phase tracking reference signal for a single carrier and within a time domain; and
transmit, on the single carrier and to a user equipment (UE), the phase tracking reference signal,
wherein the phase tracking reference signal is based at least in part on a sequence with zero mean and a low cross-correlation property.

23. The apparatus of claim 22, wherein the sequence is initiated based at least in part on an index of a slot that includes the phase tracking reference signal and an indicator of an antenna port that the base station used to transmit the phase tracking reference signal.

24. The apparatus of claim 22, wherein the phase tracking reference signal is based at least in part on an index of a symbol that includes the phase tracking reference signal.

25. The apparatus of claim 24, wherein the phase tracking reference signal is based at least in part on an indicator of a layer including the symbol.

26. The apparatus of claim 22, the phase tracking reference signal is configured to allow the UE to estimate phase noise based at least in part on the phase tracking reference signal.

27. The apparatus of claim 22, wherein the one or more processors are further configured to:
transmit, to the UE, an indication of a period associated with the phase tracking reference signal,
wherein the phase tracking reference signal is transmitted based at least in part on the period.

28. The apparatus of claim 22, wherein the phase tracking reference signal is based at least in part on an indicator of an antenna port and an index of a symbol that includes the phase tracking reference signal.

* * * * *